United States Patent [19]
Yungul

[11] 3,747,403
[45] July 24, 1973

[54] GRAVIMETRIC DETERMINATION OF ANOMALIES LATERAL TO BOREHOLES

[75] Inventor: Sulhi H. Yungul, Fullerton, Calif.

[73] Assignee: Chevron Research Company, San Francisco, Calif.

[22] Filed: July 27, 1970

[21] Appl. No.: 59,783

[52] U.S. Cl. ................................................ 73/151
[51] Int. Cl. ............................................ E21b 47/00
[58] Field of Search ..................... 73/151, 152, 382

[56] References Cited
UNITED STATES PATENTS
2,570,659  10/1951  Fay et al. ............................... 73/382
3,233,105   2/1966  Youmans ........................... 73/152 X

*Primary Examiner*—Jerry W. Myracle
*Attorney*—R. L. Freeland, J. A. Buchanan, Jr. and G. F. Magdeburger

[57] ABSTRACT

A portable gravimeter is traversed over a selected interval in an exploratory borehole. Formation density data is obtained for the same selected interval. This gravity and density information is then combined with the gravity value at the surface of the borehole when no anomaly is present, the "free air" correction and the Bouguer correction to obtain a measured perturbation effect. The measured perturbation effect represents the net perturbation in the gravity values measured within the borehole due to the presence of a gravimetric anomaly lying lateral to the borehole. The measured perturbation effect is subjected to high pass filtering to render it solely a function of the lateral distance from the borehole to the adjacent flank of the gravimetric anomaly. A trend is subtracted from the filtered measured perturbation effect. Anomaly models are then employed to simulate the gravimetric anomaly which produces the measured perturbation effect. A calculated perturbation effect is generated for the anomaly model. This calculated perturbation effect is high pass filtered and is subjected to trend subtraction. Finally, the filtered measured perturbation effect is compared with the filtered calculated perturbation effect and differences are noted. The parameters of the anomaly model are varied to reduce these differences and further comparisons are made. The process of varying parameters and making comparisons is repeated with the aid of iterative computer programs employing regression techniques such as the method of least squares. When the differences between the filtered measured perturbation effect and the filtered calculated perturbation effect are smaller than some preassigned arbitrary number the anomaly model represents the actual anomaly. The distances between the anomaly model and the simulated borehole are the actual distances between the gravimetric anomaly and the exploratory borehole.

8 Claims, 10 Drawing Figures

INVENTOR
SULHI H. YUNGUL

BY Norman E. Reitz
Ralph L. Freeland Jr.
ATTORNEYS

INVENTOR
SULHI H. YUNGUL
BY Norman E. Reitz
Ralph L. Freeland
ATTORNEYS

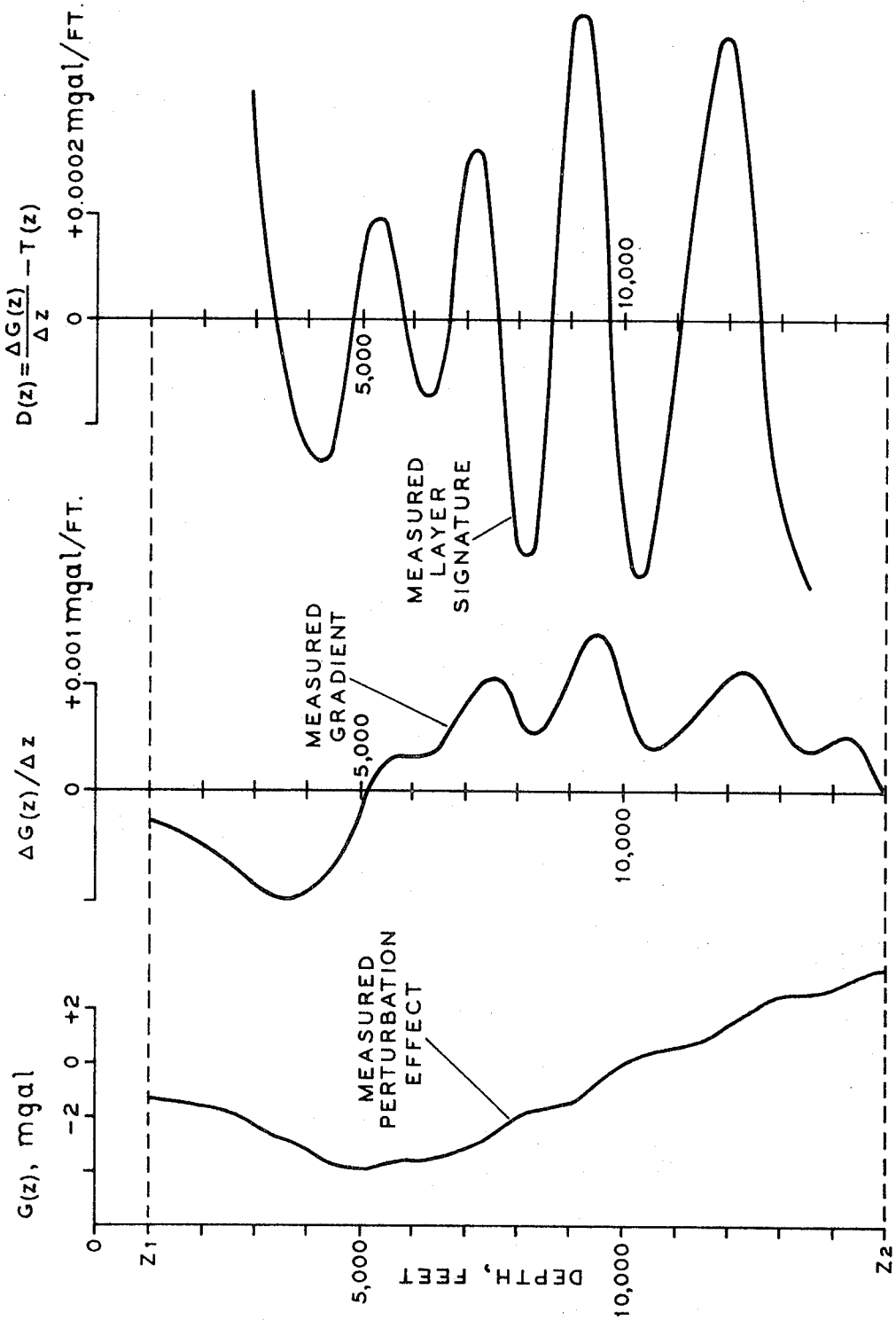

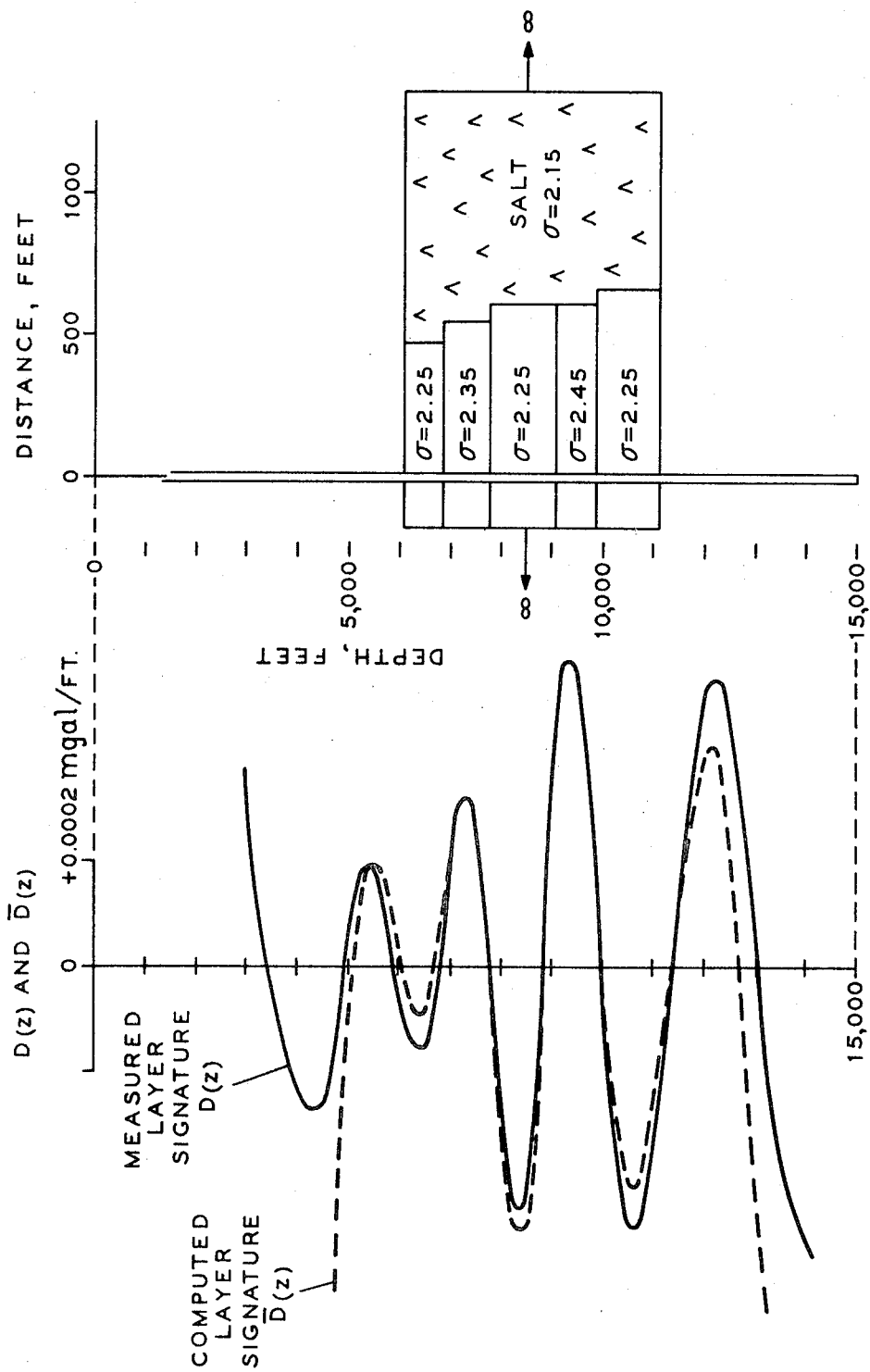

3,747,403

GRAVIMETRIC DETERMINATION OF ANOMALIES LATERAL TO BOREHOLES

The present invention relates to gravity prospecting. More particularly, it relates to determining (1) the distance to the flanks of a salt dome from a wellbore drilled through earth formations adjacent to said salt dome, (2) the distance to a rock formation in the proximity of a wellbore that has been near-missed by the well, and (3) the boundaries of a salt dome or rock formation that has been penetrated by the well.

BRIEF DESCRIPTION OF THE DRAWINGS

For assistance in obtaining a more detailed understanding of the method of my invention, reference may be had to the following description of the drawings which are incorporated herein and made a part of this specification.

FIG. 5a is a graph illustrating the measured perturbation effect.

FIG. 5b is a graph illustrating the measured gradient derived from the measured perturbation effect of FIG. 5a.

FIG. 5c is a graph illustrating the measured layer signature derived from the measured gradient of FIG. 5b.

FIG. 5d is a graph illustrating the fit obtained between the measured layer signature of FIG. 5c and the computed layer signature derived from the anomaly representation of FIG. 4.

FIG. 5e is a pictorial diagram illustrating the salt flank profile obtained by employing the FIG. 4 embodiment of my invention.

GENERAL BACKGROUND OF THE INVENTION

Figure 1:
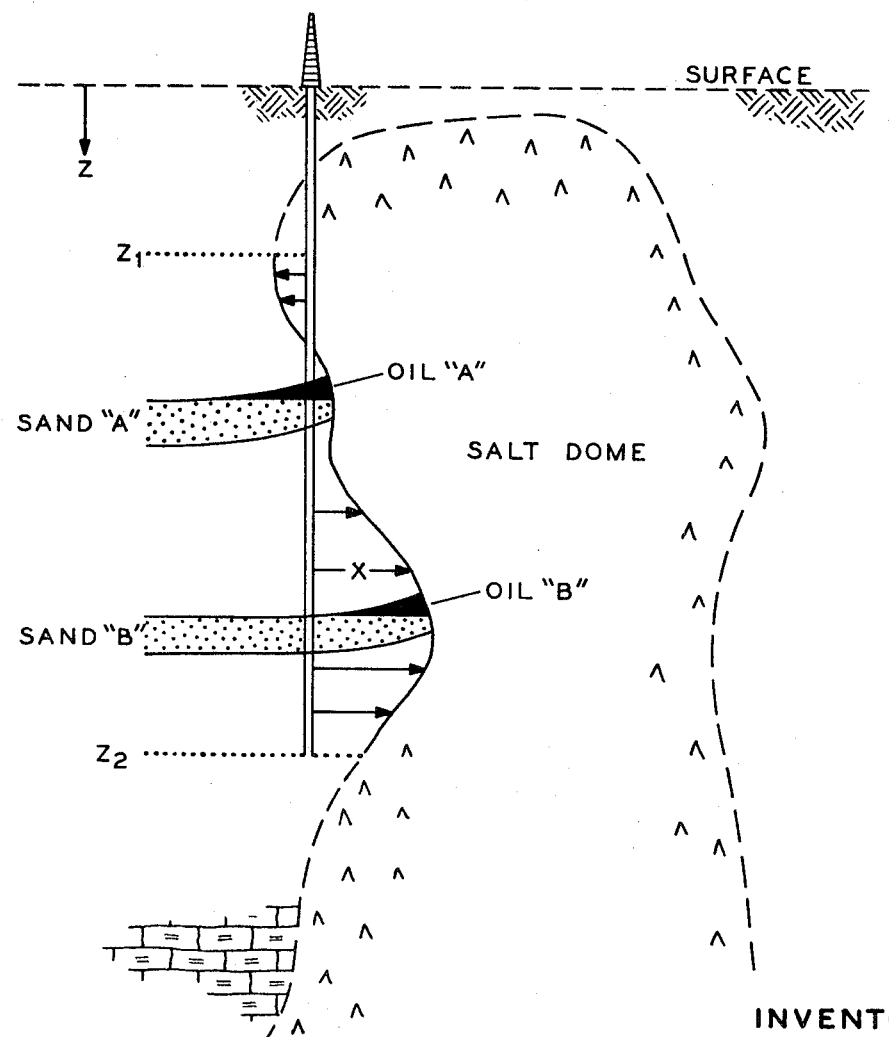
FIG. 1 is a pictorial diagram of an irregular salt dome which has intruded into a sedimentary formation. An exploratory wellbore is shown as penetrating the top of the salt dome at one point and as extending alongside the dome elsewhere.

An appreciable portion of the oil production in the United States is from reservoirs associated with piercement salt domes in the Gulf of Mexico region and in the Paradox Basin. About twelve percent of the domestic production in 1964 came from salt dome structures of all types. Most of the oil associated with piercement domes is found within 1,000 feet of a salt flank in the manner shown in FIG. 1. The general location of the salt dome is known from surface exploration, but the locations of its flanks, especially at certain depths where possible pay sands may be truncated by the salt, are not known with an accuracy that would be sufficient for oil field development. Referring now to FIG. 1, one can see that Oil "A" was discovered to be associated with Sand "A," while Sand "B" turned out to be dry. If the salt flank is only a few hundred feet away from the wellbore, it is very likely that this sand is dry throughout. However, if the flank is far away, say 1,200 feet away, Sand "B" could have an oil pool near the flank and should be explored by a properly deflected borehole that has to be planned in accordance with the location of the salt flank at the depth of Sand "B." Therefore, knowledge of the salt flank configuration is of critical economic importance. At present, salt flanks are developed to some extent by trial-and-error drilling, which is expensive. If a borehole does not hit an expected producing zone, it becomes very important to measure the distance, $x$, from the borehole to the salt flank as a function of depth, $z$, as shown in FIG. 1.

Previous methods of solution to the general problem indicated above have been given in three U.S. Patents. U.S. Pat. No. 3,256,480, issued to Runge, Worthington and Yungul, teaches a method in which the signals from long-spaced electric logging tools, tools whose electrodes are spaced apart at distances of 75 feet or more, are compared with those from short-spaced electric logging tools to detect the resistivity effects of anomalous bodies lateral to the borehole. U.S. Pat. Nos. 3,286,168 and 3,412,815, both issued to Holser, Unterberger, and Jones, teach the method of reflecting electromagnetic radiation from the walls of a salt dome to determine the distance to those walls, the radiation being sent from and received by an instrument within a borehole drilled inside the salt dome. Each of these prior art methods has its particular usefulness, but it also has particular requirements in order that it may be carried out. For instance, the electrical method of Runge, Worthington and Yungul definitely requires an uncased borehole outside the anomaly, e.g., the salt dome to be detected, while the method of Holser, Unterberger and Jones definitely requires an uncased borehole inside the salt dome whose walls are to be delineated. In the method of my invention, any type of borehole is suitable, cased or uncased, inside or outside, or partly inside and partly outside the anomalous body, and the type of borehole drilling fluid, or lack or it, does not appreciably affect the practice of the method of my invention.

It is now possible to make gravity measurements in wellbores by means of gravity meters. One such instrument is manufactured by LaCoste and Romberg, Inc. The present specification describes a new method whereby borehole gravity measurements, combined with borehole density measurements obtained either by means of a commercially available well-logging device or from core samples, are used to locate the flanks of a salt dome or the extension of, or proximity to, a rock formation.

Figure 2A:
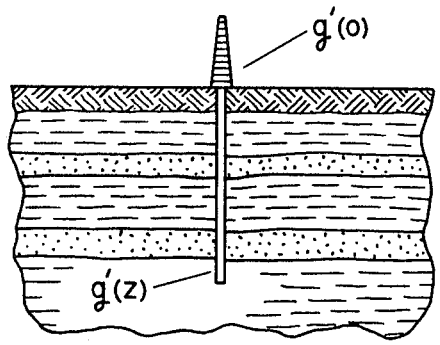
FIG. 2a is a pictorial diagram of an exploratory wellbore drilled in a sedimentary formation in a region where no anomalies are present.

In FIG. 2a the geologic formations in the region of the wellbore are shown to be horizontal layers of infinite extent. Thus, the density function, $\sigma$, is a function of depth, $z$, only. The gravity measured at the surface, at zero depth, is denoted by $g'(0)$, and the gravity at a depth, $z$, is denoted by $g'(z)$. It is well known in the art of gravity prospecting that $g'(z)$ is related to $g'(0)$ via the "free-air" and Bouguer corrections in a fixed manner:

$$g'(z) = g'(0) + Fz - 4\pi\gamma \int_0^z \sigma(z)dz \qquad (1)$$

where F is the normal (non-anomalous) vertical gradient of the earth's gravitational field in the air (also called the free-air gradient) and $\gamma$ is the universal gravitational constant. In the right hand expression of equation (1), the second term is called the free-air correction and the third term is called the Bouguer correction. These corrections, as well as the magnitudes of F and $\gamma$ are discussed and defined in reference textbooks on gravitational exploration. See, for example, Grant and West, Interpretation Theory in Applied Geophysics, Chapter 9, 1965.

Figure 2B:
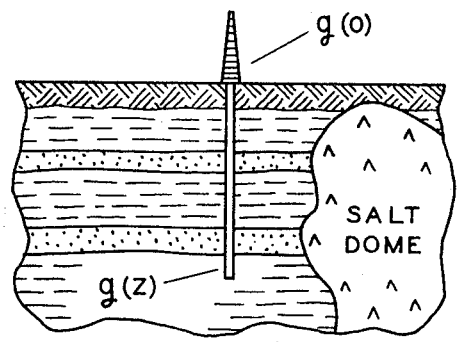
FIG. 2b is a pictorial diagram of an exploratory wellbore drilled in a sedimentary formation in the vicinity of a salt dome.

In FIG. 2b equation (1) is not valid due to the fact that the subsurface no longer has horizontal homogeneity. In this case the gravity at the surface is denoted by $g(0)$ and the gravity at depth $z$ is denoted by $g(z)$. The value of $g(z)$, however, can be related to that of $g'(z)$ by considering $g(z)$ to be the result of a horizontally layered subsurface, i.e., $g'(z)$, plus a perturbation effect, $G(z)$. The perturbation effect is due to the fact that some of the sedimentary section of density $\sigma(z)$ has been replaced by salt of density $\sigma_s$. From this statement it follows that the perturbation log is given by:

$$G(z) = g(z) - g'(0) - Fz + 4\pi\gamma \int_0^z \sigma(z)dz \quad (2)$$

Since gravity measurements are relative, the constant $g'(0)$ can be assumed to be zero or any arbitrary but convenient number. The perturbation effect is seen to be the anomalous gravitational effect due to a fictitious mass distribution confined to the volume of the salt; the density of the fictitious mass distribution is $\delta(z) = \sigma_s - \sigma(z)$ and is called the "density contrast." As far as the perturbation effect, $G(z)$, is concerned, no mass exists outside the volume taken up by the anomaly. The perturbation effect, then, is dependent solely on anomalous bodies lateral to the borehole.

It would seem that the measured perturbation effect could be used in a straightforward manner to determine salt geometry. This straightforward approach involves taking a surface gravity map consisting of $g(0)$ values at a plurality of geographic positions on the earth's surface and interpreting the map with the use of the known values of $\sigma(z)$ and $\sigma_s$. The interpretation is intrinsically ambiguous because an infinite number of possible salt dome configurations could have been responsible for the surface gravity map. However, only one of the possible salt dome configurations would have yielded a perturbation log identical to the measured log of the perturbation effect. Thus, the measured log of the perturbation effect could be used to determine the salt geometry. However, this method, although simple, is not practical; its accuracy is inadequate and the cost of conducting such an analysis is high. There are three reasons for the impracticality. First, surface gravity is not sensitive to structure over a steep flank at appreciable depths, such as the undulations near Oil "B" in FIG. 1. Second, the perturbation log is severely truncated. For example, in FIG. 1, data is available only within the depth range between $z_2$ and $z_1$ while an adequate definition of the salt mass would require data from a range four times as large, including data for heights in the air and data for depths under the salt. Third, the fitting process necessary to obtain a fit between measured and computed perturbation logs is very laborious because the salt surface is three-dimensional, large, and complex, and the process, therefore, does not lend itself to an automatic self-iterative operation that can be done by means of electronic computers.

The object of my invention, then, is to determine the distance, $x$, to the salt flank as a function of depth, $z$, directly from a log of the perturbation effect which has been measured within the $z_2 - z_1$ interval only, as shown in FIG. 1, without relying on a surface gravity map and salt models derived therefrom.

It is also an object of my invention to render the determination of the distance, $x$, to the salt flank effectively independent of the "distant zone" of the salt surface, i.e., that portion of the salt which lies relatively far from the logged part of the wellbore. The "distant zone" is represented in FIG. 1 by a dashed line. This latter objective is theoretically impossible to achieve exactly but if some amount of theoretical error, in addition to experimental error, is allowed, then it becomes possible and practical to achieve this objective.

BRIEF DESCRIPTION OF THE INVENTION

To accomplish the aforementioned objectives, the measured log of the perturbation effect, $G(z)$, is analogized to a time-series, where $z$ represents the 'time,' so that the application of filtering to $G(z)$ can be stated in familiar terminology, e.g., "frequency" $f$ in terms of cycles per unit length of $z$. Then, in accordance with the well known theory of gravitational potential, the attenuation of a harmonic component of frequency, $f$, of the $G(z)$ function with distance, $d$, from the source of gravitational attraction (the anomalous mass) to a point of observation in the wellbore is proportional to the factor $[\exp.(-2\pi fd)]$. Consequently, the contribution of the distant zone to the $G(z)$ function resides primarily in the low frequencies, the high frequencies having been effectively attenuated due to the relatively large distance. Therefore, the effect of the distant zone can be made tolerable if an appropriate kind of high-pass filtering of the $G(z)$ is done. The result of appropriate filtering is that the filtered $G(z)$ function, excluding those portions near either end of the measured log of the perturbation effect, depends on the one unknown parameter, $x$, namely the distance to the salt. The relatively high frequency variations in the filtered $G(z)$ function are practically solely due to the truncation of sedimentary formations against the salt flank in juxtaposition to the wellbore in the region of inquiry and are hereinafter called "layer signatures." Since $x$ is the only independent parameter, it can be obtained by running a self-iterating automatic fitting program on an automated data processing machine whereby $x$ is varied until a computed layer signature is matched to the measured layer signature. The $x$ distances corresponding to the layer signature which matches the measured log of the perturbation effect represent, in fact, the actual lateral distances from the wellbore to the flanks of the salt dome. Of course, since the selection of layer signatures is generated by filtering a series of hypothetical logs of perturbation effects, it is necessary to filter the hypothetical logs of the perturbation effect in the same manner as the logs of the measured perturbation effect are filtered in order to preserve a quantitative correspondence between the computed and measured layer signatures.

DETAILED DESCRIPTION OF THE INVENTION

While the previous description of my invention is generally adequate, a more detailed understanding of the individual steps which comprise the method of my invention can be obtained by reference to the following sequential listing of steps.

1. Run a borehole gravimeter in a wellbore to obtain $g(z)$, gravity as a function of depth.

2. Run a density logging tool such as a gamma-gamma densilogger in a wellbore, or measure the density of core samples taken at various depths in a wellbore, or compute the density from a set of other types of logs, or compute the density in a wellbore via equation (1) from gravimetric measurements made in another wellbore which is substantially far from any lateral inhomogeneity, and thereby obtain the formation density-versus-depth function, $\sigma(z)$.

3. Obtain the perturbation log, $G(z)$, by inserting the measured values for $g(z)$ and $\sigma(z)$ in equation (2).

4. Perform a high-pass filtering operation of the perturbation log, $G(z)$, e.g., take the vertical gradient of $G(z)$ or derivatives of higher order. In one embodiment of my invention a vertical gradient of gravity is measured directly thereby permitting the direct derivation of the first derivative of the perturbation log, $G'(z)$.

5. Subtract a "trend," $T(z)$, from the filtered $G(z)$. $T(z)$ may be obtained by fitting a polynomial of low degree to the perturbation effect, $G(z)$, by using an automatic, weighted least-squares fitting program on a digital computer. Removal of trends from measured data by polynomial fitting using the method of least-squares is well known in the art. See, for instance, "A Problem in the Analysis of Geophysical Data," by F. Grant in *Geophysics*, 22, 309–344 (1957). The trend which is subtracted is not necessarily monotonic and may have a polynominal character which reflects the character of the filtered perturbation effect, $G(z)$. The degree of $T(z)$, i.e., the degree of the polynomial used to fit the perturbation effect, $G(z)$, is obtained automatically by a subroutine included in the automatic fitting program. The degree of the polynomial can be selected automatically in a subroutine by successively increasing it until the improvement in the fit of the polynomial to $G(z)$ is smaller than some prescribed value. In practice, the degree may vary from 3 to 10 but is usually not greater than 5. Alternatively, the degree may be obtained by a visual inspection of the filtered perturbation effect, $G(z)$.

The trend can also be obtained by utilizing spline fitting techniques. These techniques involve fitting a function which is a polynomial over subintervals, to the perturbation effect, $G(z)$.

The result of the subtraction of the trend is denoted as the measured layer signature, $D(z)$. The trend subtraction step can be interchanged with Step 4 but it cannot be eliminated because the length of the "time series" otherwise would be too short for the wavelengths associated with the distant portions of anomalies so that statistical time-series analysis could not be used to isolate the layer signatures.

Figure 4:
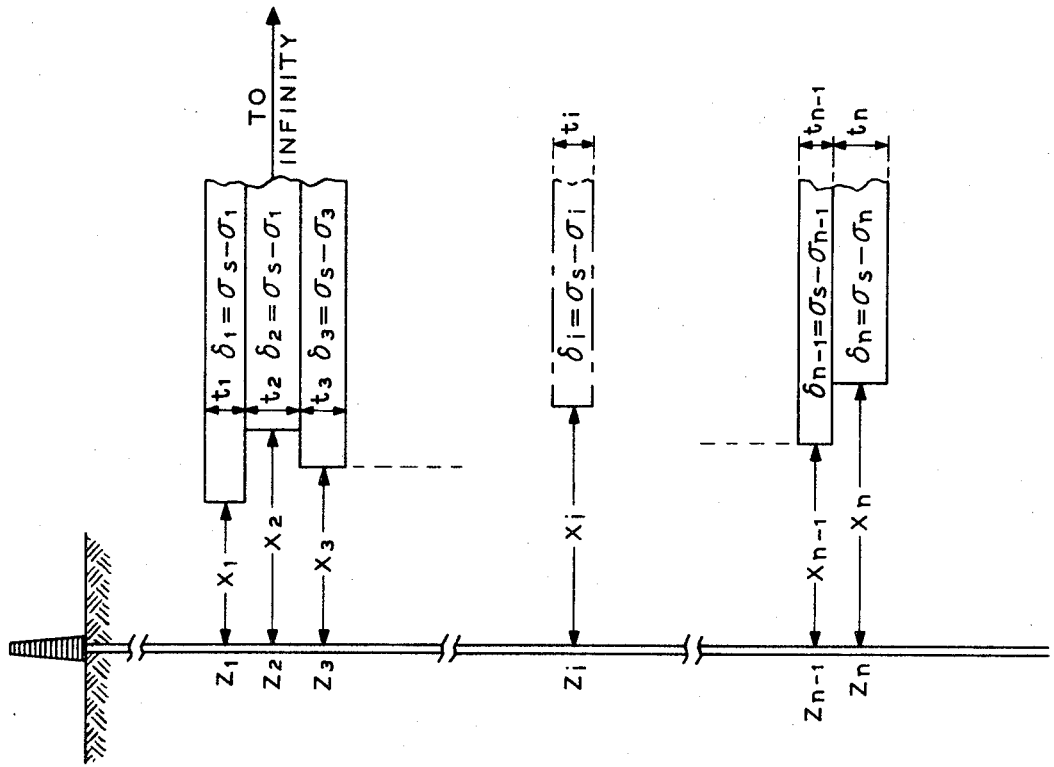
FIG. 4 is a stack of semi-infinite horizontal slabs which represent, in another embodiment of my invention, the unknown anomaly on an automated data processing machine such as a digital computer.
Figure 3:
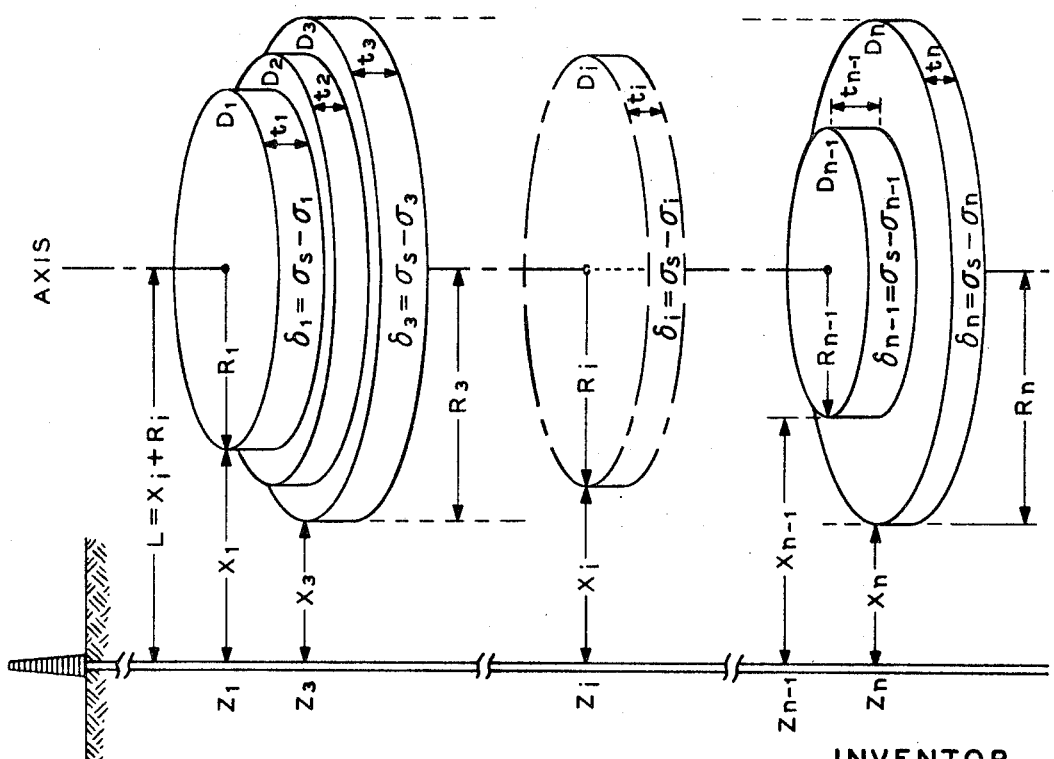
FIG. 3 is a stack of discs with varying radii and thicknesses which represents, in one embodiment of my invention, the unknown anomaly on an automated data processing machine such as a digital computer.

6. Employ an anomaly model type, previously programmed on a digital computer, to simulate the presence of an anomaly. In one embodiment of my invention the programmed model type is the stack of horizontal co-axial (the axis is parallel to the borehole) discs with varying radii and thicknesses shown in FIG. 3. The distance, L, shown in FIG. 3 can be estimated from other data but the estimate need not be accurate. In another embodiment a stack of horizontal slabs is used. These slabs are oriented so that the borehole is located on the common median plane of the rectangles, the three sides of the rectangular slabs farthest away from the boreholes lie on common vertical planes and so that the sides opposite to the borehole are step-wise. In a still further embodiment a stack of horizontal semi-infinite slabs is used as shown in FIG. 4. These slabs are identical to the rectangular slabs described above except that the sides of the slabs most remote from the borehole are assumed to be at infinity. This assumption simplifies computation and introduces little error so long as the average ratio of the radius of the anomalous mass being investigated to the distance between the borehole and the anomalous mass, $x$, is larger than about 4. The average diameter of piercement salt domes in the Gulf Coast region in the United States is about 2 miles so that the semi-infinite slab is a suitable embodiment when my invention is practiced with data taken in the vicinity of Gulf Coast salt domes. In general, any programmed anomaly model type can be used so long as $x$, the distance between the borehole and the anomaly, is the only independent variable.

When a region is known to have a dip an anomaly model can be programmed so that the layers of rock which surround the model are assigned the known dip. The introduction of a dip renders the practice of the method of my invention more difficult. The examples relied upon, therefore, in subsequent steps will be based on the case of horizontal layering.

Beyond this point no human intervention is required; an electronic computer completes the solution by means of a regression method computer program and lists or plots the distances, $x$, for each layer, from the borehole to the salt flank. The initial distances can be picked arbitrarily by the computer program, but an initial realistic estimate may reduce computation time. The algorithm employed by the computer is explained in the following steps.

7. Compute automatically by means of a digital computer the gravitational effect that the simulated anomaly would have at a plurality of points along the borehole, a computation which is well known in the art of gravity exploration. See, for example, Grant and West, Interpretation Theory in Applied Geophysics, Chapter 10, 1965. This gravitational effect is called the computed perturbation log and is designated $\overline{G}(z)$. In reality, $\overline{G}(z)$ is the vertical component of the gravitational attraction due to the aforementioned model type which consists of layers of thickness $t_i$ and the fictitious density, $\delta_i$, all confined to the volume of the anomalous mass (e.g., salt). The values of $t_i$ and $\delta_i$ are known from Step 2.

8. Perform the same high-pass filtering operation on the computed perturbation effect, $\overline{G}(z)$, as was performed on the perturbation, $G(z)$, in Step 4.

9. Remove a "trend," $\overline{T}(z)$ from the filtered $\overline{G}(z)$. $\overline{T}(z)$ need not be the same as $T(z)$ which was used in Step 5, but may be generated in any of the ways discussed therein. As above, the trend need not be monotonic and its character will reflect the character of the filtered computed perturbation effect. The order of Steps 8 and 9 may be reversed. The result of Step 9 is designated as the computed layer signature, $\overline{D}(z)$.

10. The measured layer signature, $D(z)$, is known at a plurality of observation points, $z_j$, where $j = 1,2,3, \ldots m$. These values are represented by $D_j(z_j)$. The computed layer signature, $\overline{D}(z)$, is computed for all of the observation points, $z_j$; it is a function of the observation point depth, $z_j$, the layer thickness, $t_i$, where $i = 1, 2, 3, \ldots n$, and $n$ is the number of layers in the anomaly model type, the density contrasts of the layers, $\delta_i$, and the distances, $x_i$, $$\bar{D}_j = \bar{D}_j(z_j, t_i, \delta_i, x_i).$$

The quantities $z_j$, $t_i$, and $\delta_i$ are known while the $x_i$'s are unknown. The objective is to vary $x_i$ until the inequality $$D_j - \bar{D}_j \leq \epsilon, \tag{3}$$

is satisfied at all of the observation points, $z_j$ ($\epsilon$ is an arbitrarily fixed small quantity). This can be accomplished by employing the well known method of least-squares. The least squares method takes the quantity $$Q = \tfrac{1}{2} \sum_{j=1}^{j=m} [D_j - \bar{D}_j(x_i)]^2 \tag{4}$$

where $j = 1, 2, 3, \ldots m$, and $i = 1, 2, 3, \ldots n$, and minimizes $Q$ by imposing the constraints $$\left. \begin{array}{l} \partial Q / \partial x_1 = 0 \\ \partial Q / \partial x_2 = 0 \\ \partial Q / \partial x_n = 0 \end{array} \right\} \tag{5}$$

A simultaneous solution of equations (5) would lead to the determination of the distances, $x_i$, but since the equations are non-linear there is no known direct (one-step) process for solving them. Consequently, an iterative procedure requiring linearization of the mathematical expressions at some stage must be used. Such linearization and iteration can be done by the well known Gauss-Newton or Newton-Raphson methods. (See, for instance, R. E. Barieu and B. J. Dalton, "Nonlinear Regression and the Principle of Least Squares," U.S. Department of Interior, Bureau of Mines, Report of Investigation 6900, July 1966.) An example of the application of the least-squares method to a similar problem is given by C. E. Corbato in "A Least-Squares Procedure for Gravity Interpretation," *Geophysics*, 30, 228–233 (1965). Other regression techniques than the least-squares method may also be used. An example is given by J. H. Healy and F. Press in "Geophysical Studies of Basin Structures Along the Eastern Front of the Sierra Nevada, California," *Geophysics*, 20, 337–359 (1964).

The distances, $x_i$, obtained by means of these automatic regression processes, satisfy equation (3) and reveal the vertical profile of the anomalous mass being investigated.

While the foregoing step-wise listing of the elements of my invention is sufficient to enable one skilled in the art of gravity exploration to practice my invention, the following example is a typical embodiment which demonstrates the utility of my invention.

FIG. 5a is a perturbation log, $G(z)$, calculated by equation (2), supra, from a hypothetical but realistic representation of gravity and density data which would ordinarily be determined in accordance with Steps 1 and 2. The vertical gradient, $\Delta G(z)/\Delta z$, of this perturbation log was then taken and is shown in FIG. 5b. The curve of FIG. 5b, then, represents the result of high-pass filtering and corresponds to the output of Step 4, supra.

A trend, $T(z)$, was obtained by fitting a selectively weighted polynomial to the vertical gradient of FIG. 4b. The trend, $T(z)$, was then subtracted from $\Delta G(z)/\Delta z$ to produce the layer signature, $D(z)$, as shown in FIG. 5c.

The semi-infinite horizontal slab anomaly model consisting of a stack of horizontal semi-infinite layers with known thicknesses and density contrasts was used to generate a computed perturbation effect $\bar{G}(z)$. The vertical gradient of the computed perturbation effect, $\partial \bar{G}(z)/\partial z$, was then taken. A trend, $\bar{T}(z)$, was then subtracted from $\partial \bar{G}(z)/\partial z$ in accordance with Step 9, supra, to produce a computed layer signature, $\bar{D}(z)$.

Finally, the arbitrary $x$ distances between the borehole and the semi-infinite horizontal layers of the model were varied by a self-iterative program on a digital computer to render the differences between $D(z)$ and $\bar{D}(z)$ quite small, as shown in FIG. 5d. The $x$ distances used to generate the computed layer signatures of the semi-infinite horizontal slab anomaly model, shown in FIG. 5d, correspond to the actual lateral distances from the borehole to the anomalous body being investigated, as shown in FIG. 5e.

The utility of my invention extends to situations other than the investigation of the boundaries of gross anomalies. For example, the method of my invention would apply to determine the proximity of a single bed of sand which was not intercepted by the wellbore. This is simply the case where the anomaly model would be reduced to a single disc or slab. Also, the method of my invention can be used to determine the horizontal extent of a sand bed that has been intercepted by a wellbore. The absence of sand beyond the edge of the sand bed is a gravitational anomaly whether the surrounding formation is denser or less dense than the sand bed. Finally, if the contour of an anomaly is convoluted so that an overhang obscures the primary curvature of the anomaly the method of my invention can be used to map the overhang. A multivariable anomaly model would be required but the method of my invention would be applied without significant alteration.

While specific examples have been utilized in this specification to demonstrate the method of my invention, it is intended that the scope of my invention be limited only by the scope and spirit of the appended claims.

I claim:

1. The method of gravimetrically prospecting for geologically anomalous bodies lateral to an exploratory borehole and for determining the lateral distance thereto, comprising the steps of:

a. measuring the density of the formations surrounding said borehole by running a gamma-gamma density logging device within said wellbore over the interval under study;

b. traversing a borehole gravimeter within said wellbore over said interval under study to obtain measurements of the acceleration due to gravity as a function of depth;

c. determining the net gravitational perturbation effect of a geologically anomalous body in accordance with the following relationship:

$$G(z) = g(z) - g'(0) - Fz + 4\pi\gamma \int_0^z \sigma(z) dz$$

where $g(z)$ is the acceleration due to gravity as a function of depth when an anomaly is present, $g'(0)$ is the acceleration due to gravity at the surface when no anomaly is present, F is the free-air gradient, $\gamma$ is the universal gravitational constant, and $\sigma(z)$ is the density of the formations as a function of depth;

d. removing the contributions to the net perturbation effect from the more distant regions of said anomaly by taking the vertical gradient or derivatives of higher order of said net perturbation effect thereby rendering said net perturbation effect a function of the single parameter of lateral distance from said borehole to said anomaly;

e. determining the lateral distances from said borehole to said anomaly at various depths within said interval under study by means of a least-squares method self-iterating computer program.

2. The method of gravimetrically prospecting for geologically anomalous bodies lateral to an exploratory borehole and for determining their lateral distances from said borehole over a given depth interval, comprising the steps of:

a. measuring the densities of the geologic formations surrounding said borehole at a plurality of successive points along said borehole over said given depth interval;

b. computing a space-derivative of the gravitational potential that would exist over said given interval of said borehole if said measured densities represented geologic formations that extended laterally away from said borehole to infinity, with no interruptions by lateral anomalous bodies, the first order space-derivative of said gravitational potential being represented by the following equation, with higher order space-derivatives being derivatives of said equation:

$$g'(z) = g'(0) + Fz - 4\pi\gamma \int_0^z \sigma(z) dz$$

where $g'(z)$ is the acceleration due to gravity as a function of depth when no anomaly is present, $g'(0)$ is the acceleration due to gravity at the surface when no anomaly is present, F is the free-air gradient, $\gamma$ is the universal gravitational constant, $\sigma(z)$ is the density of the formations as a function of depth, and z is depth;

c. traversing a gravity-responsive instrument along said borehole over said given depth interval to measure the corresponding actual space-derivative of gravitational potential as a function of depth;

d. subtracting said computed space derivative of gravitational potential from said measured actual space-derivative of gravitational potential for successive points along said given depth interval, to generate the perturbation function which is due to lateral anomalous bodies;

e. high-pass filtering said generated perturbation function to remove the contributions to said function made by the more distant regions of said lateral anomalous bodies, to produce a filtered perturbation function over said depth interval that is dependent mainly upon the short lateral distances from the said borehole to said anomaly; and f. comparing said filtered perturbation function with a set of corresponding filtering perturbation functions based on models of anomalous bodies of various shapes at various distances calculated in accordance with steps (b) through (e), and choosing the model whose calculated corresponding filtered perturbation function most nearly matches said filtered perturbation function derived from steps (a) through (e) as most nearly representing actual anomalous bodies lateral to said borehole, the distances represented in said model being approximately the actual distances from said borehole to said actual anomalous bodies.

3. The method of claim 2, wherein said gravity-responsive instrument is a borehole gravimeter which measures the acceleration due to gravity.

4. The method of claim 2, wherein said gravity-responsive instrument measures a space-derivative of gravitational acceleration thereof.

5. The method of claim 2, wherein the densities of said geologic formation are measured in core samples removed from said formations.

6. The method of claim 2, wherein the densities of said formation are measured by a density logging device traversed through said borehole.

7. The method of gravimetrically prospecting for geologically anomalous bodies lateral to an exploratory borehole and for determining their lateral distances from said borehole over a given depth interval comprising the steps of:

a. measuring the densities of the geologic formations surrounding said borehole at a plurality of successive points over said given depth interval;

b. traversing a borehole gravimeter within said borehole over said given depth interval to measure the acceleration due to gravity as a function of depth;

c. determining the net gravitational perturbation effect of a geologically anomalous body in accordance with the following relationship:

$$G(z) = g(z) - g'(0) - Fz + 4\pi\gamma \int_0^z \sigma(z) dz$$

where $g(z)$ is the acceleration due to gravity as a function of depth when an anomaly is present, $g'(0)$ is the acceleration due to gravity at the surface when no anomaly is present, F is the free-air gradient, $\gamma$ is the universal gravitational constant, and $\sigma(z)$ is the density of the formations as a function of depth;

d. removing the contributions to the gravitational perturbation effect from the more distant regions of said anomaly by determining a derivative of the gravitational acceleration of said perturbation effect, e. subtracting a selectively weighted polynomial function of said derivative of gravitational acceleration from said net perturbation so that the remainder of said perturbation effect essentially is a function of the single parameter of the shortest lateral distance from said borehole to said anomaly; and f. determining the shortest lateral distances from said borehole to said anomaly at various depths within said given depth interval by means of a least-squares method self-iterating computer program.

8. The method of claim 7 wherein said gravitational acceleration derivative of said net perturbation effect is directly measured as a function of depth over said given depth interval by means of a gravity gradiometer.

* * * * *